United States Patent [19]

Seville

[11] Patent Number: 5,217,663
[45] Date of Patent: Jun. 8, 1993

[54] MOLDING METHOD FOR SCRUBBING SPONGE

[75] Inventor: Alan Seville, Indianapolis, Ind.

[73] Assignee: Cabot Safety Corporation, Southbridge, Mass.

[21] Appl. No.: 711,503

[22] Filed: Jun. 3, 1991

Related U.S. Application Data

[62] Division of Ser. No. 567,084, Aug. 14, 1990, abandoned, which is a division of Ser. No. 327,900, Mar. 23, 1989, Pat. No. 4,969,226.

[51] Int. Cl.5 ............................................. B29C 37/00
[52] U.S. Cl. ..................... 264/51; 264/45.3; 264/161
[58] Field of Search ............ 425/812; 249/141; 264/161, 51, 45.3; 15/244.2, 244.4; 269/51

[56] References Cited

U.S. PATENT DOCUMENTS

| | | | |
|---|---|---|---|
| 1,877,527 | 9/1932 | Moran | 15/244.4 |
| 1,987,390 | 1/1935 | Davis | 15/244.4 |
| 2,651,810 | 9/1953 | Snyder | 425/805 |
| 2,693,006 | 11/1954 | Shigekawa | 264/48 |
| 2,700,178 | 1/1955 | Blake | 425/812 |
| 3,443,281 | 5/1969 | Walby | 249/141 |
| 3,822,857 | 7/1974 | Tanie | 249/141 |
| 4,264,337 | 4/1981 | Fenster et al. | 15/244.1 |
| 4,422,986 | 12/1983 | Cole | 425/805 |
| 4,469,463 | 9/1984 | Van Overloop | 401/134 |
| 4,482,513 | 11/1984 | Auletti | 425/812 |
| 4,525,091 | 6/1985 | Van Overloop | 401/134 |
| 4,563,103 | 1/1986 | Van Overloop et al. | 401/134 |
| 4,627,129 | 12/1986 | Wittes | 15/244.4 |
| 4,780,361 | 10/1988 | Schlein | 156/79 |
| 4,800,054 | 1/1989 | Roestenberg | 264/161 |
| 4,812,281 | 3/1989 | Beard et al. | 425/812 |
| 4,866,806 | 9/1989 | Bedford | 15/244.4 |

*Primary Examiner*—Allan R. Kuhns
*Attorney, Agent, or Firm*—Michelle B. Lando

[57] ABSTRACT

A method for molding a scrubbing sponge wherein raw materials are added a mold cavity having a bottom half and a top half having at least one cavity connected to a venting portion. The raw materials are foamed and expanded to pass through the cavity and vent until flashing is formed on the top of the mold. As the foam passes through the cavity and vent during the foaming cycle, it will become progressively denser as a result of the restrictive flow leading to the small opening of the vent.

6 Claims, 3 Drawing Sheets

MOLDING METHOD FOR SCRUBBING SPONGE

This is a divisional of copending application(s) Ser. No. 07/567,084 filed on Aug. 14, 1990, now abandoned, which is a divisional application of Ser. No. 07/327,900 filed on Mar. 23, 1989, now U.S. Pat. No. 4,969,226.

FIELD OF INVENTION

This invention relates to artificial sponges for cleaning purposes.

BACKGROUND OF THE INVENTION

Sponges are used for a variety of cleaning purposes including washing the human body and scrubbing floors. The ordinary sponge is generally soft and pliable when wet. Although various types of sculptured sponges have been used in the past, for the most part all of them had a uniform surface texture. Sponges have also been combined with plastic brushes by clipping them or molding them to the plastic brush. These products are typically more expensive than a sponge alone. There is a need for a sponge which has a scrubbing surface as well as a smooth surface that can be molded of a single material. I provide a sponge which may be molded from polyurethane using a two piece mold. My sponge preferably has one flat face and an opposite face having frusto-conical projections, the tips of which are significantly harder than the surface of the sponge. These hard tips provided improved scrubbing action. The tips are formed during the molding process. The sponge is particularly useful for medical applications.

DESCRIPTION OF THE PREFERRED EMBODIMENTS

Figure 1:
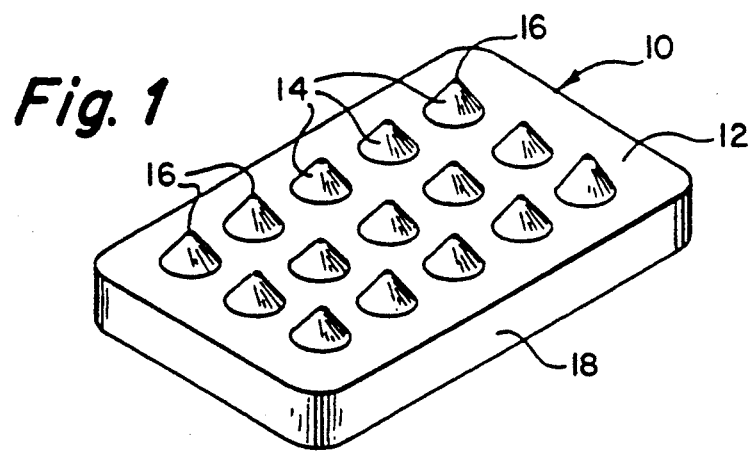
FIG. 1 is an perspective view of the sponge of the present invention.
Figure 2:
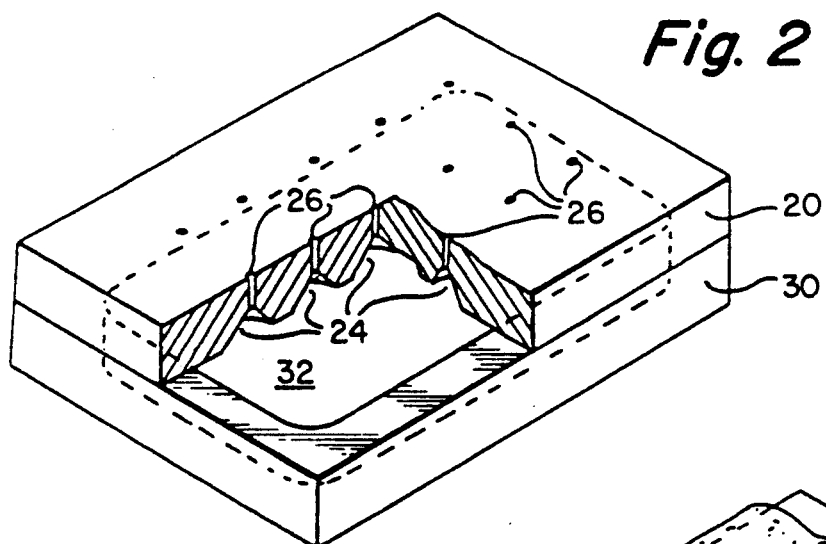
FIG. 2 is a perspective view partially in section of the mold used to make the sponge of FIG. 1.

Referring to FIG. 1, I provide a sponge which is preferably generally rectangular. Sponge 10 preferably has one flat underside surface which is not visible in the drawings and a top surface 12 having a plurality of frusto-conical projections 14. Each projection has a tip 16 which is substantially harder than the surface of sponge 10. These hard tips provide improved scrubbing action.

Sponge 10 is formed in a two piece mold shown in FIGS. 2 thru 5. The top 20 of the mold has a plurality of preferably frusto-conical cavities 24 each of which is connected to a vent tube 26 that extends through the top 20 of the mold. Cavities 24 could also be truncated pyramids or any similar shape in which diameters through the projection become progressively smaller as one moves toward the vent. The bottom half the mold 30 preferably has a generally rectangular cavity 32. This cavity 32 may have an insert or further cavity 34 to apply a brand name or other marking on the surface of the sponge. I prefer to provide for a depth of cavity 32 which will be equal to the height of the sponge and thereby form sides 18 of the sponge.

I prefer to make a sponge having a plurality of projections 14 which are approximately 0.25 inches in diameter at their base and have a height of 0.2 inches. Preferably, the height of sides 18 of the sponge is 0.375 inches. The base diameter of the projections 14 is preferably 0.35 inches. I prefer to make the vent holes 26 approximately 0.07 inches in diameter. I have found that making a frusto-conical cavity 24 having a sidewall which forms an angle of 83 degrees from horizontal is most satisfactory. I prefer to provide a ½ inch spacing between adjacent frusto-conical projections 14. I further prefer to provide a sponge which is two inches wide and three inches long.

Figure 3:
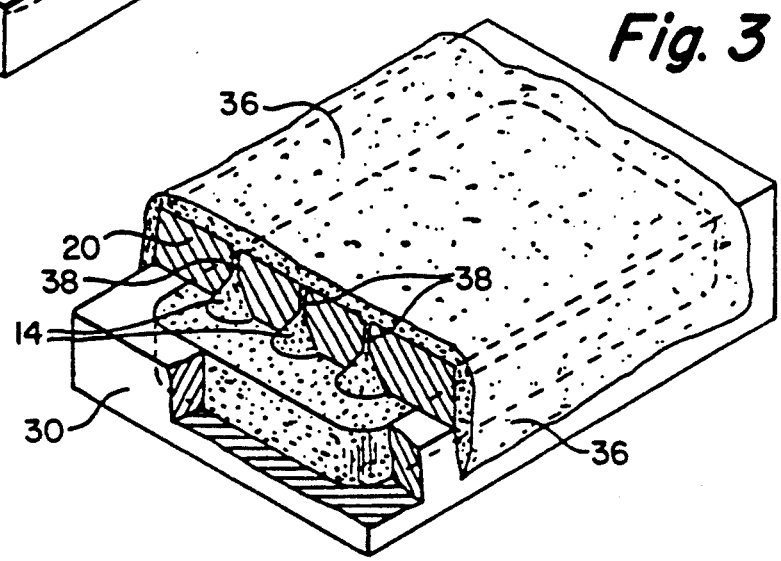
FIG. 3 is a perspective view similar to FIG. 2 after the mold has been filled with a foam material and the foaming reaction has been completed.
Figure 4:
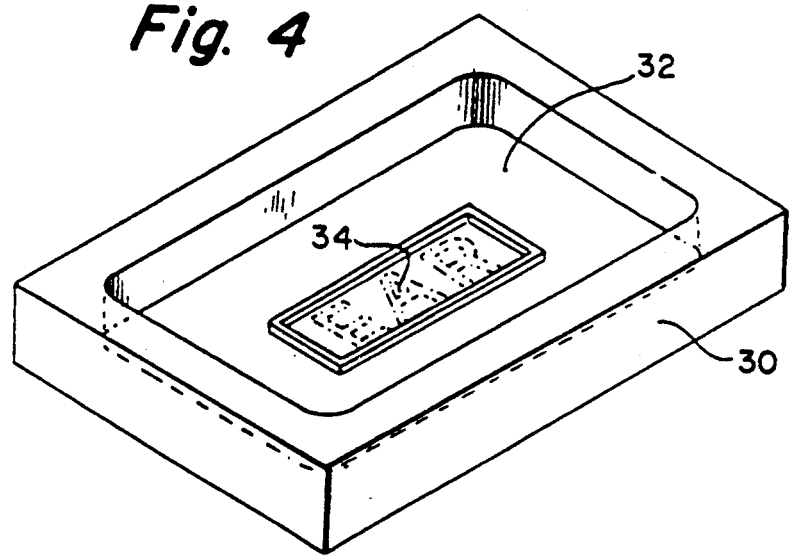
FIG. 4 is perspective view of the bottom half of a mold of FIG. 2.
Figure 5:
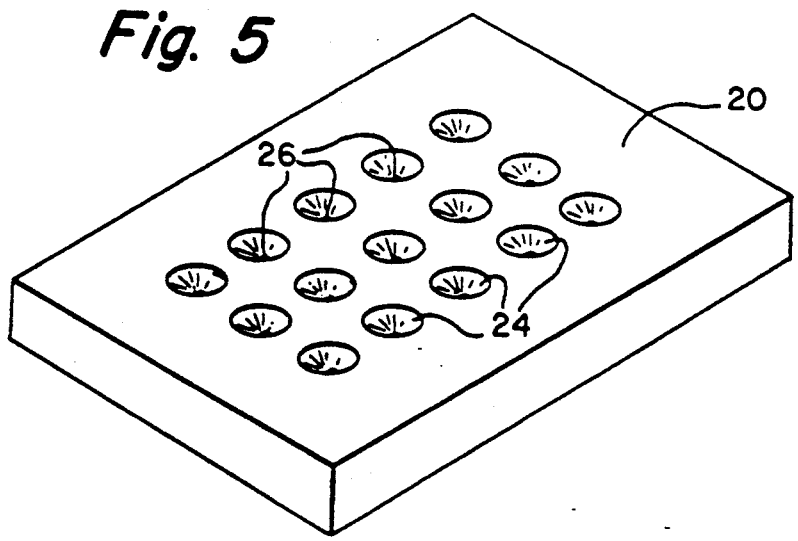
FIG. 5 is a perspective view of the top half of the mold of FIG. 2.

In FIG. 3, I have shown the mold partially cut away after it has been filled with the raw materials and allowed to foam. When the raw materials are added to the mold they are placed in the bottom half 30 of the mold. Sufficient raw material is placed in mold cavity 32 so that during forming the foam will pass through the vents 26. The amount of material placed in the mold as well as the degree of venting will affect the density of the foam. I prefer to make my sponge of a density from 7 pounds per cubic inch to 18 pounds per cubic inch. I have found that the HYPOL prepolymer of W. R. Grace Company can be used to make a suitable foam material.

During the foaming step the material which has been placed in cavity 32 expands as carbon dioxide is generated. Air in the mold escapes through vents 26. As the foam expands, it fills cavities 24 and continues through vents 26 to form flashing 36 on top of the mold. After foaming has completed that flashing 36 is removed and the top half 20 of the mold is separated from the bottom half 30. During foaming the material becomes much denser as it passes through the frusto-conical section and vents 26. When the mold is separated some flashing will remain attached to frusto-conical portions 14. These rods of flashing 38 are quite stiff and relatively dense. They can easily be broken from the frusto-conical portion 14. When that is done a tip 16 of very dense material will remain. I have found that dense hard tip provides an improved scrubbing feature to my sponge. The density of the tip 16 and flashing 36 will be affected by the diameter and length of the vents 26. As the foam passes through the frusto-conical section and vent 26 during the foaming cycle it will become dense because of the progressively restrictive flow leading to the small opening of the vent. Additionally, air escapes from the gas cells within the foam as they break passing through vent 26.

The sizing of the vent holes will depend upon the nature of the material used for the sponge and the length of the vents 26. The holes must be small enough to cause sufficient densification, but not so small as to become clogged or to prevent sufficient venting during molding. I have found that fifteen vent holes approximately 0.07 inches in diameter work well for a sponge 0.375 inches thick, three inches wide and four inches long.

Although the sizing of the vent holes will determine the difference in density of the projections and the density of the sponge body, those skilled in the art will recognize other factors which will determine the actual density of the body and projections. Fillers could be added to increase density. Density is also related to cell size and strength which can be changed by many known techniques.

I have found that any projection which is harder or stiffer than the sponge body provides improved scrubbing action. However, it appears that the stiffest projections work best. Since the stiffness of the projections is proportional to their density in a homogenous formulation one can relate projection density to density of the sponge body. Also since the density of the scrubbing projections is apparently controlled by their venting, a series of scrub sponges having different vent sizes were used to determine the vent size at which the density of the cones is maximized.

Sponges were made using a standard sponge mold having the dimensions of 3"×2"×0.6". A series of different mold tops having frusto-conical cavities with vent sizes ranging in diameter from 19 mils to 133 mils with a vent length of 50 mils were used make the sponges. The sponges were made from a 1:1 mixture of Hypol 2002 and water with 2% Brij 72. Enough material was poured into the mold so that approximately 50% would flow out of the vents. The sponges were demolded after approximately 8 minutes and allowed to cure several days wet. The sponges were frozen using liquid nitrogen and the cones were scythed from the body of the sponge. Both sponge bodies and cones were then dried for one half hour at 100° C. followed by conditioning for three days at 50% relative humidity. The sponge bodies and cones were then weighed and measured. Densities for each were calculated and the density ratio was reported as the ratio of the density of the cone to that of the sponge body and the vent area is reported for a single vent. Table I reports the data shown are for single sponge body samples and an average of 5 cones scythed from that sponge.

Densities were calculated as follows:

*Sponge body Density (lbs/ft³)* $= w / ((l \times w \times h) - cf)) / 0.2625$ where w = weight of sponge body in grams
l = length of sponge body in inches
w = width of sponge in inches
h = height of sponge in inches
cf = correction factor used to account for a lower volume for the sponge body due to corner rounding and logo Scrub cone Density (lbs/ft³) is $$\frac{w}{\pi \times \frac{H}{3} \times \left(\left(\frac{D_1}{2}\right)^2 + \left(\frac{D_1}{2} \times \frac{D_2}{2} \times \left(\frac{D_2}{2}\right)^2\right)\right)} \div 0.2625$$

where w = weight of the cone grams
H = the height of the cone in inches
D1 = the base diameter of the cone in inches
D2 = the tip diameter of the cone in inches

TABLE I

| Vent Diameter (mils) | Vent Area (mils²) | Density (lbs/ft³) Body | Density (lbs/ft³) Cone | Density Ratio |
|---|---|---|---|---|
| 19 | 283.5 | 17.39 | 19.17 | 1.102 |
| 29 | 660.5 | 13.68 | 16.42 | 1.200 |
| 39 | 1194.6 | 13.16 | 15.88 | 1.207 |
| 50 | 1963.5 | 13.02 | 17.32 | 1.330 |
| 59 | 2734.0 | 12.68 | 19.16 | 1.511 |
| 70 | 3848.4 | 11.91 | 18.46 | 1.550 |

TABLE I-continued

| Vent Diameter (mils) | Vent Area (mils²) | Density (lbs/ft³) Body | Density (lbs/ft³) Cone | Density Ratio |
|---|---|---|---|---|
| 80 | 5026.5 | 13.44 | 21.34 | 1.588 |
| 94 | 6939.8 | 12.37 | 23.82 | 1.925 |
| 125 | 12271.8 | 10.76 | 20.23 | 1.880 |
| 133 | 13892.9 | 10.39 | 18.31 | 1.762 |

Figure 6:
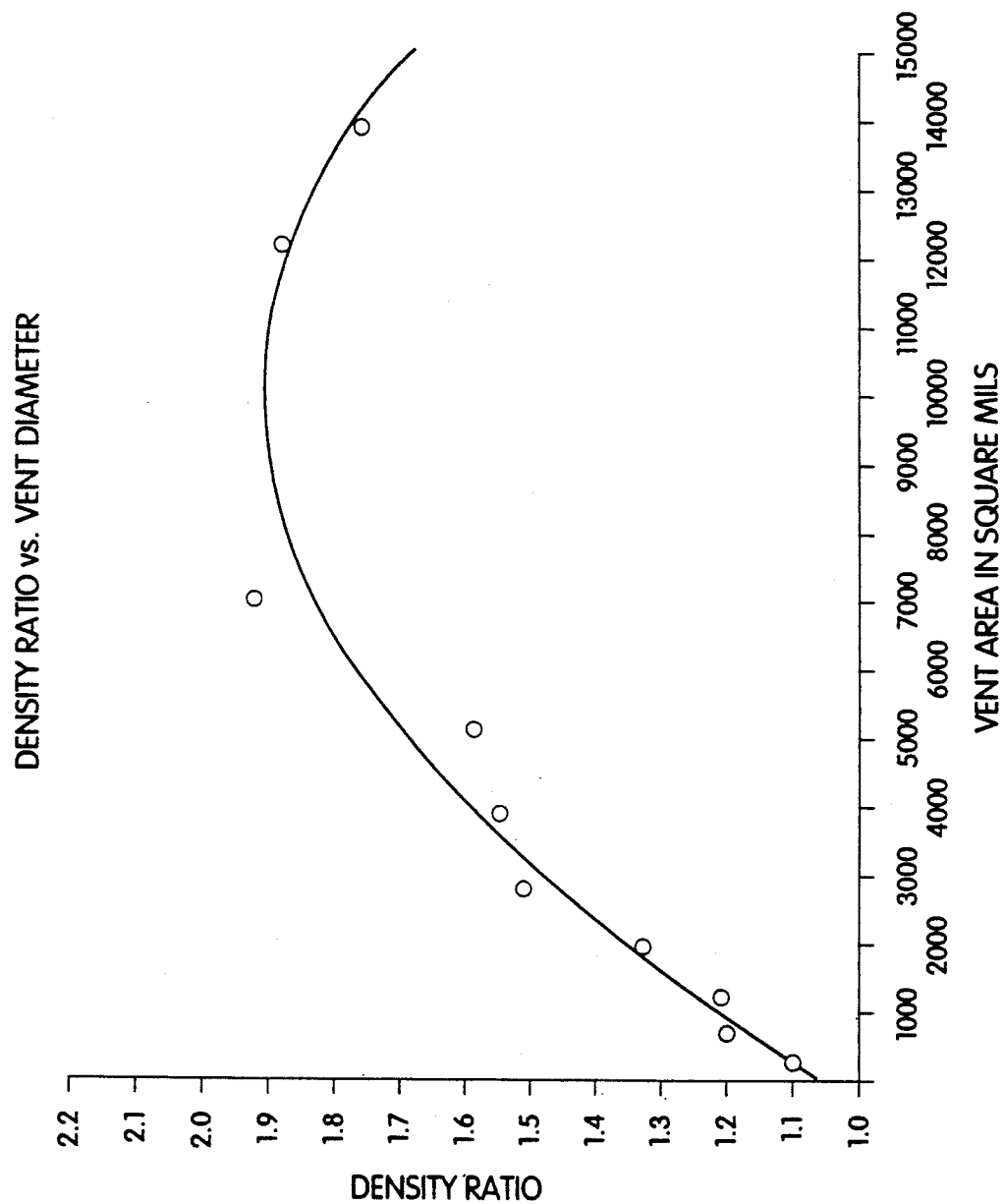
FIG. 6 is a graph of the data in Table I.

The data of Table I is plotted in FIG. 6. Then, I fit a curve to the data points by regression analysis. The regression relation of density ratio to vent area using a 2nd degree polynomial is:

*Density Ratio* $= -8.572 \times 10^{-9} X^2 + 1.719 \times 10^{-4} X + 1.0478$ where X = area of vent in square mils
$r^2$ for the fit of the regression is 0.961775

Setting the first derivative equal to zero and solving for X determines the maximum density ratio. For the data of Table I, the curve shows maximum density ratio occurs at 10027 sq. mils or at 106 mils vent diameter. At that point there is a maximum density ratio of 1.909. However, the density ratio for the 94 mil vent indicate that slightly higher ratios of at least 2 to 1 are possible. Moreover, one may be able to add fillers or other additives to alter processing or achieve even greater ratios.

During or after forming my sponge may be infused with soap, fungicides, bacteriastats or other materials. The choice of materials will depend upon the intended use of the sponge.

While I have described and shown certain present preferred embodiments of my sponge and mold for making same, it should be understood that the invention is not limited thereto, but may be variously embodied within the scope of the following claims.

I claim:

1. A method for molding a scrubbing sponge comprising the steps of:
    adding sufficient raw materials to a mold cavity having a bottom half and a top half, said top half having at least one cavity connected to a vent that extends through the top of said mold, the diameter of said cavity becoming progressively smaller towards said vent:
    foaming said raw materials and expanding a portion of said foam into said cavity and through said vent until flashing is formed on the top of said mold, wherein said foamed material in said mold becomes a sponge body and said foamed material in said cavity becomes a projection on said sponge body;
    removing said flashing from the top of said mold and separating said bottom and top halves of said mold to produce a scrubbing sponge;
    allowing said scrubbing sponge to cure; and
    removing any remaining flashing from said projection,
    wherein said projection of said scrubbing sponge is significantly denser than said sponge body.

2. The method as claimed in claim 1 wherein said sufficient raw materials are such that approximately 50% of said materials poured into said mold pass through said vent.

3. The method as claimed in claim 1 wherein said raw materials include a prepolymer and water in equal proportions.

4. The method as claimed in claim 1 wherein fillers are added to said raw materials to increase density.

5. The method as claimed in claim 1 wherein soaps, fungicides, bacteriastats, or any combination thereof are added to said raw materials.

6. The method as claimed in claim 1 wherein said cavity is frusto-conical.

* * * * *